United States Patent
Eaton et al.

[11] Patent Number: 5,960,327
[45] Date of Patent: Sep. 28, 1999

[54] METHOD FOR A TRANSCEIVER TO SELECT A CHANNEL

[75] Inventors: Eric Thomas Eaton, Lake Worth; Von Alan Mock, Boynton Beach, both of Fla.

[73] Assignee: Motorola, Schaumburg, Ill.

[21] Appl. No.: 08/761,263

[22] Filed: Dec. 6, 1996

[51] Int. Cl.⁶ ............................... H04B 1/10; H04B 1/16
[52] U.S. Cl. ..................... 455/38.3; 455/343; 370/311
[58] Field of Search .................... 455/38.3, 343, 455/574, 450, 127, 67.1, 226.1, 452, 522, 557, 63, 566; 370/311, 465, 468

[56] References Cited

U.S. PATENT DOCUMENTS

| | | | |
|---|---|---|---|
| 5,054,052 | 10/1991 | Nonami | 455/574 |
| 5,095,308 | 3/1992 | Hewitt | 455/343 |
| 5,293,639 | 3/1994 | Wilson et al. | 455/17 |
| 5,392,462 | 2/1995 | Komaki | 455/552 |
| 5,483,682 | 1/1996 | Norimatsu | 455/127 |
| 5,546,411 | 8/1996 | Leitch et al. | . |
| 5,590,399 | 12/1996 | Matsumoto et al. | 455/450 |
| 5,603,095 | 2/1997 | Uola | 455/67.1 |
| 5,613,208 | 3/1997 | Blackman et al. | 455/38.3 |
| 5,613,227 | 3/1997 | Maki et al. | 455/127 |
| 5,615,213 | 3/1997 | Griefer | 370/412 |
| 5,625,889 | 4/1997 | Chikkaswamy et al. | 455/450 |
| 5,627,528 | 5/1997 | Kuznicki | 455/38.3 |
| 5,629,934 | 5/1997 | Ghosh et al. | 455/8.3 |
| 5,640,415 | 6/1997 | Pandula | 455/63 |
| 5,649,299 | 7/1997 | Battin et al. | 455/62 |
| 5,666,655 | 9/1997 | Ishikawa et al. | 455/452 |
| 5,687,171 | 11/1997 | Shin et al. | 455/450 |
| 5,724,663 | 3/1998 | Lee | 455/557 |

FOREIGN PATENT DOCUMENTS

| | | | |
|---|---|---|---|
| 0000824 | 1/1989 | Japan | 455/343 |
| 404331518 | 11/1992 | Japan | 455/343 |

*Primary Examiner*—Reinhard J. Eisenzopf
*Assistant Examiner*—Edan Orgad
*Attorney, Agent, or Firm*—Eduardo Guntin; John H. Moore

[57] ABSTRACT

A transceiver (10) used in an RF messaging system transmits unscheduled messages on a channel selected by the transceiver (10). The transceiver (10) examines a number of factors prior to selecting a channel, including the power available from its battery (39), the power required to send the message, and which channel it had previously used to successfully transmit a message. Depending on the results of this examination, the transceiver (10) can reject the channel it has used successfully on previous occasions and select a different channel having a different data rate.

10 Claims, 2 Drawing Sheets

5,960,327

METHOD FOR A TRANSCEIVER TO SELECT A CHANNEL

FIELD OF THE INVENTION

This invention is directed to the field of portable RF (Radio Frequency) transceivers of the type used in messaging systems, and particularly to methods for transmitting unscheduled messages from such transceivers to one or more base station receivers.

BACKGROUND OF THE INVENTION

An example of a portable transceiver of the type discussed herein is a two-way pager that can receive messages from a base station transmitter, and also send messages to a base station receiver. Messages sent by the transceiver are generally of two kinds: scheduled messages and unscheduled messages. An example of a scheduled message is an acknowledgment signal that is automatically transmitted by the transceiver to signify that it has received a message sent by a base station transmitter. This form of scheduled message is transmitted on a channel selected by the base station and is sent at a time dictated by the signaling protocol used by the messaging system.

An unscheduled transmission is a message that originates with the transceiver and is sent to the base station during a time interval that is set aside for such messages. In a typical messaging system, the transceiver can select from one of several channels to use for sending an unscheduled transmission. Each such channel has its own frequency, and its data rate may be different from the data rate of the other available channels. One of these channels is selected by the transceiver in a somewhat random fashion according to a program built into the transceiver. The selected channel and its associated data rate will be used to send the unscheduled message, regardless of the condition of the transceiver or the suitability of the selected channel. For example, a selected channel may have a relatively poor signal-to-noise ratio. Consequently, a message sent on that channel by the transceiver may not be received properly. When the transceiver fails to receive an acknowledgment that its message was received, it may then repeat its efforts to send the message on the same channel.

As a result of this and other problems discussed later, messages sent by the transceiver may be severely delayed, or possibly never received. This result is obviously unacceptable to the user of the transceiver and to the operator of the messaging system.

DESCRIPTION OF THE PREFERRED EMBODIMENT

Figure 1:
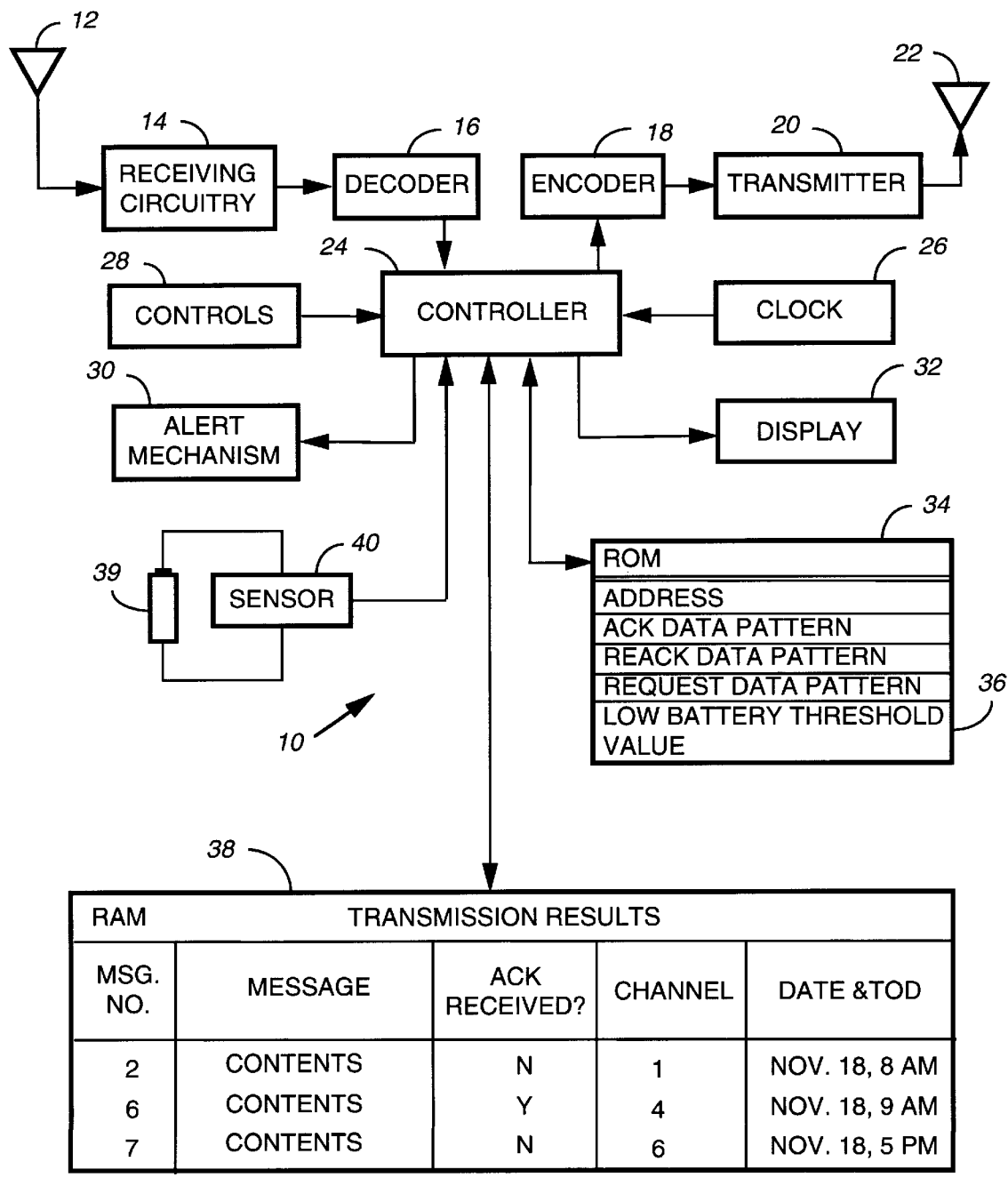
FIG. 1 is a block diagram of an RF transceiver that operates in accordance with the invention.

Referring to FIG. 1, a transceiver 10 is shown in the form of a two-way pager that communicates with a base station, and/or other transceivers. In operation, messages are typically sent on a forward (outbound) channel from a base station transmitter (not shown) to one or more transceivers such as the transceiver 10. Upon receipt of a message, the transceiver 10 automatically sends an ACK (acknowledgment) signal back to the base station on a reverse (inbound) channel selected by the base station.

The transceiver 10 can also originate and send to the base station, or to another transceiver, on a reverse channel, a message that is unscheduled. When the intended recipient receives the unscheduled message, it replies to the transceiver 10 with an ACK signal.

There are typically up to eight reverse channels which the transceiver 10 can choose from for sending an unscheduled message. Each of these reverse channels has an associated data rate. The data rates typically associated with the reverse channels in a messaging system using the ReFlex protocol (ReFlex is a trademark of Motorola, Inc.) are : 800 bps (bits per second), 1600 bps, 3200 bps, 6400 bps, and 9600 bps. The frequency of each of these channels is typically between 899 and 901 MHz.

In the transceiver 10, an incoming message is received by an antenna 12 and routed to receiving circuitry 14. A decoder 16, coupled to the receiving circuitry 14, decodes the received message. An encoder 18 encodes data to be transmitted into a signaling format such as the ReFleX™ protocol, and the transmitter 20 modulates the encoded data and provides it to a transmitting antenna 22.

A controller 24, which may be a HC 11 microprocessor made by Motorola, Inc., controls the operation of the transceiver 10, and a clock 26 provides time values to the controller 24. User controls 28 are coupled to the controller 24 for providing user-initiated signals thereto, and an alert mechanism 30 is coupled to the controller 24 for alerting a user when a message has been received. Messages are presented to the user by a display 32.

A ROM (Read Only Memory) 34, coupled to the controller 24, stores non-changeable information that is used by the controller 24 in operating the transceiver 10. For example, the ROM 34 stores the transceiver's address, ACK data pattern, REACK data patterns and request data pattern. The three data patterns dictate the format of certain messages that the transceiver 10 transmits. Element 36 is a portion of ROM 34 that stores the value of a low battery threshold that is discussed later.

A RAM (Random Access Memory) 38 stores transmission results, i.e. the results of the transceiver trying to send an unscheduled message. These results are used by the transceiver 10 in a manner that is described later.

All the elements described so far in the transceiver 10 are conventional and operate conventionally, except for elements 36 and 38 and the controller 24 which is programmed to operate in accordance with the invention. Further, it should be understood that various other conventional elements have been omitted from FIG. 1 for the sake of brevity and clarity. For example, the RAM 38 (or another RAM) will hold stored messages, message numbers associated therewith, an indication of whether an ACK signal has been transmitted for each received message, and other information that is conventionally stored in a memory of a transceiver.

The transceiver 10 is powered by a conventional battery 39 which is typically a 1.6V alkaline or carbon zinc cell. In accordance with one aspect of the invention, when the transceiver 10 is preparing to transmit an unscheduled message, the voltage at the output of the battery 39 is read by a conventional voltage sensor 40 which sends to the controller 24 information indicating the battery's output voltage. The controller 24 compares the sensed battery voltage to the low battery threshold (stored in element 36) to determine the amount of power that is available from the battery. The controller also determines the amount of power required to transmit the unscheduled message on a given channel (a channel that is provisionally selected for transmitting the message). If the power required to transmit the message exceeds the power available from the battery, the controller rejects the given channel and selects a different channel on which to transmit the message. The different channel is selected on the basis that it has a data rate that is higher than the data rate of the given channel. Conversely, if the power available from the battery exceeds the power required to send the unscheduled message, then the controller 24 selects the given channel on which to transmit the unscheduled message.

The given channel is preferably a channel which has a history of successful transmissions at about the same time of day, and preferably the best history of success among the available channels. For example, if the user desires to send an unscheduled message at 9:00 am, the controller 24 examines data in the RAM 38 to determine which channel was recently successful in sending an unscheduled message at about the same time of day. As indicated in the transmission results stored in RAM 38, the transceiver 10 successfully transmitted message number 6 on channel 4 at 9:00 am. Success on channel 4 is indicated by the "Y" (yes) in the column marked "ACK received?" In this example, therefore, channel 4 is the "given" channel for which the controller 24 calculates power requirements. If the power available from the battery is greater than or equal to the power required to send the message on channel 4, then channel 4 is selected to carry the message. If the power available to send the message on channel 4 is insufficient, then the controller 24 selects a channel having a higher data rate than channel 4. Thus, if channel 4's data rate is 800 bps, controller 24 selects a channel whose data rate is 1600 bps or higher, because less transmission power is required to transmit at the higher data rate.

The above and other aspects of the invention are discussed further in connection with the operation of the controller 24 as described in connection with the flowchart shown in FIG. 2. This flowchart indicates how the controller 24 is programmed to operate the transceiver 10 in accordance with the invention.

Figure 2:
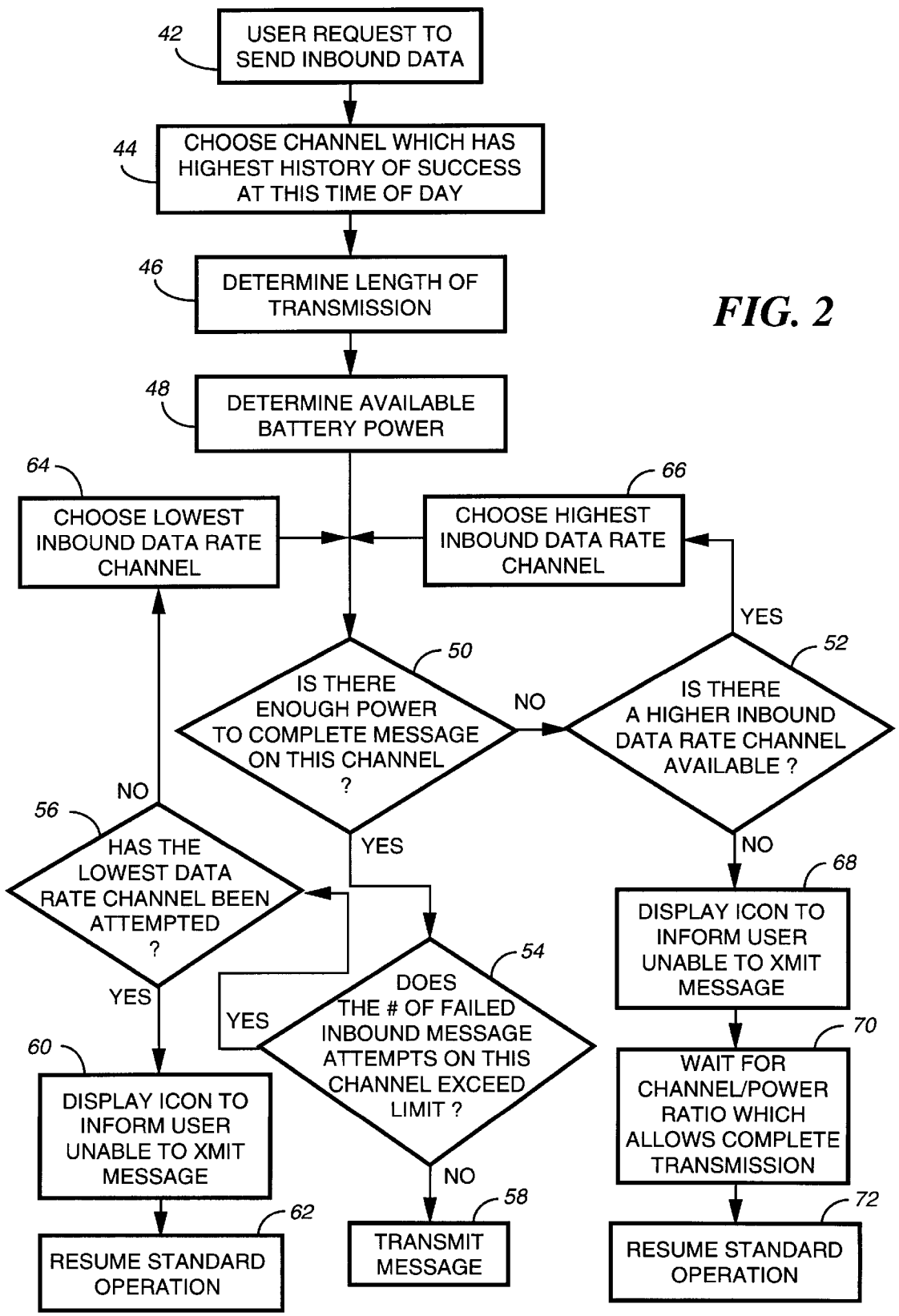
FIG. 2 is a flow chart depicting how the controller of FIG. 1 is programmed to control the operation of the RF transceiver according to the invention.

Referring to FIG. 2, step 42 indicates that the user, via controls 28, is requesting that data be sent on an inbound (reverse) channel. This corresponds to a request to send an unscheduled message. In the next step 44, the controller chooses a channel that has the highest history of success at the present time of day. This information is contained in the RAM 38 which stores message numbers in the first column and the contents of each message under "Message" in the second column. The third column indicates whether the transmitted message resulted in an ACK. An ACK is only received by the transceiver 10 in response to a message sent by the transceiver 10 and properly received by the intended addressee. In the fourth column, the channel number is stored for each message transmitted. The last column gives the date and time of day when each message was sent.

The illustrated transmission results show that an ACK was not received in response to message numbers 2 and 7, so those messages may not have been received. However, an ACK was received in response to message number 6. Accordingly, the controller 24 selects channel 4 (provisionally) for transmission of the message.

In step 46, the controller 24 determines the length of the desired transmission by counting the bits in the message to be sent. A high bit count will require more transmission power than a low bit count.

In the next step 48, the controller 24 determines the amount of power that is available from the battery 39. Assume, for example, that the battery 39, when fully charged, produces a 9.0 volt output; and that it has been previously determined that a voltage of 6.0 volt is the lowest voltage from the battery that is usable for transmitting a message. The value of 6.0 volts is stored in element 36 as the low battery threshold.

We also assume that the power available from the battery is linearly related to its output voltage. Thus, if the sensor 40 senses that a 9.0 volt battery has discharged from 9.0 volts down to 7.0 volts (down 2.0 volts of its useful 3.0 volt range), this reflects a 66% decrease in its useful output voltage. If the same battery has an available power of 526 ma hrs (milliamp hours) when fully charged to 9.0 volts, its available power will have been reduced by 66% to about 179 ma hrs when its output voltage drops to 7.0 volts. This is the calculation that the controller 24 makes is step 48. Thus, it determines that, for the example used above, the available battery power is approximately 179 ma hrs.

The program then proceeds to step 50 where the controller determines whether the battery can supply enough power to transmit the entire message on the channel that was selected per step 44. This is a two step determination. First, the controller uses the information developed per step 46 to determine the power required for the transmission, and the controller then compares that result (power required) to the power available that was determined per step 48. If the power required exceeds the power available, there is not enough power to complete the transmission on the channel selected in step 44, and the program proceeds to step 52. If the power available exceeds the power required, the program proceeds to step 54.

The power required to transmit a message on a given channel is calculated using the following equation:

$$P_r = T_x \frac{(\text{No. of bits})}{bps}$$

where $P_r$ is the power required, $T_x$ is a known constant that includes the power consumed by all components in the transceiver during message transmission, bps is the data rate of the channel in bits per second, and the No. of bits is the length of the message in bits as determined in step 46. Having calculated the power required to send a message, the controller 24 compares the power required to the power available which was determined in step 48, and then proceeds to either step 52 or step 54.

Assuming that there is enough power to complete the transmission, the program proceeds to step 54 to determine whether the transceiver had previously failed to send its message on the same channel and, if so, whether the number of attempts to send the message exceeded a predetermined limit. To make this determination, the controller 24 examines the transmission results stored in RAM 38 to determine how many unsuccessful attempts were made to send a message on this channel. If the number of unsuccessful attempts exceeded a stored limit (the limit may stored in ROM 34), this indicates that a problem such as a poor signal-to-noise ratio, or some other such problem makes the channel unusable at this time. In that case, the program proceeds to step 56. However, if the number of unsuccessful attempts is less than the limit value, the program proceeds to step 58 where the message is transmitted on the previously selected channel.

When the number of attempts to transmit the message exceeds the limit imposed by step 54, the program proceeds to step 56 where the controller determines whether an attempt has been made to transmit the message on the channel with the lowest data rate. The reason for this is that the channel having the lowest data rate will also usually have the best signal-to-noise ratio. If such an attempt has been made, the program proceeds to step 60 where the user of the transceiver 10 is informed that the transceiver is unable to transmit the message. This information is displayed on display element 32 of FIG. 1. The program then proceeds to step 62 where normal operation of the transceiver is resumed.

If, in the execution of step 56, the controller 24 determined that the channel with the lowest data rate had not been attempted, then the program would proceed from step 56 to step 64 where a different channel, preferably having the lowest inbound data rate of the available channels, is selected. The program then loops through steps 50 and 54 to again determine whether there is enough power to complete the message on this newly selected channel (step 50) and to determine (step 54) how many times the transceiver has attempted to send on this channel.

Referring again to step 50, and assuming that the battery does not have enough power to completely transmit a message on the selected channel, the program proceeds to step 52 which determines whether there is an inbound (reverse) channel having a higher data rate than the previously selected channel. This is based on the presumption that sending a message on a channel with a higher data rate consumes less power than transmitting the same message on a channel with a lower data rate. If there is a channel available with a higher data rate, the program proceeds to step 66 where it selects the channel with the highest data rate. The program then returns to step 50 where steps 50 and 54 are executed until either a message has been transmitted or a determination has been made that the transceiver is unable to transmit the message.

When the controller determines that the battery does not have enough power to complete its transmission (step 50) and that no higher data rate channel is available (step 52), then the program proceeds to step 68 to inform the user that the transceiver is unable to transmit the message. At step 70, the transceiver waits for a combination of channel and power available that allows it to complete the transmission. Typically, this means that the transceiver's battery must be replaced or recharged, in which case the program then proceeds to step 72 where the transceiver resumes its standard operation. When the battery has been replaced or recharged, the user can again attempt to send the message by returning to step 42. It will be appreciated that the above-described method of selecting a channel gives a user the best chance of successfully transmitting an unscheduled message. By examining the power available from the battery, the length of the message, and the other factors described above, the transceiver is able to select the channel that will usually achieve a successful transmission of the first attempt. Or if the transceiver determines that it is incapable of achieving a successful transmission, the user is alerted immediately and can take remedial action. This results in increased user satisfaction, and the system operator benefits from the more efficient use of air time.

Although the invention has been described in terms of a preferred embodiment, it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a transceiver that receives power from a battery and that transmits unscheduled messages on one of a plurality of available channels, each channel having an associated data rate, a method for the transceiver to select one of the available channels for transmission of an unscheduled message, comprising:

determining the power available from the battery;

determining the power required to transmit the unscheduled message on a given channel; and rejecting the given channel and selecting a different channel with a lower data rate if repeated transmissions on the given channel are unsuccessful.

2. In a transceiver that receives power from a battery and that transmits unscheduled messages on one of a plurality of available channels, each channel having an associated data rate, a method for the transceiver to select one of the available channels for transmission of an unscheduled message, comprising:

determining the power available from the battery;

determining the power required to transmit the unscheduled message on a given channel; and rejecting the given channel and selecting a different channel for transmission if the power required exceeds the power available, wherein determination of the power required is based on the length of the unscheduled message and the associated data rate of the given channel.

3. In a transceiver that transmits unscheduled messages on one of a plurality of available channels, each channel having an associated data rate, a method for the transceiver to select one of the channels for transmission of an unscheduled message, comprising:

transmitting the unscheduled message on a given channel and, if an initial transmission is unsuccessful, repeating the transmission of the unscheduled message on the given channel;

tallying the number of unsuccessful transmissions on the given channel;

comparing the number of unsuccessful transmissions to a threshold value; and if the threshold value is exceeded by the number of unsuccessful transmissions, selecting a different channel with a lower data rate.

4. A method as set forth in claim 3, including determining whether the transceiver has enough power to send the unscheduled message on the different channel, and accepting the different channel if sufficient power is available.

5. A method as set forth in claim 3 including, prior to transmitting on the given channel, determining whether the transceiver has enough power to send the unscheduled message on the given channel.

6. A method as set forth in claim 5 wherein the transceiver receives power from a battery, and wherein the step of determining whether the transceiver has enough power to send the unscheduled message includes:

determining the power available from the battery; and determining the power required to transmit the unscheduled message on the given channel.

7. In a transceiver that receives power from a battery and that transmits unscheduled messages on one of a plurality of available channels, each available channel having an associated data rate, a method for the transceiver to select one of the available channels for transmission of an unscheduled message, comprising:

a) determining whether the power available from the battery is sufficient to send the unscheduled message on a given channel;

b) if step a) determines that sufficient power is not available, selecting a channel with a relatively higher data rate;

c) if step a) determines that sufficient power is available, transmitting the unscheduled message on the given channel and, if an initial transmission is unsuccessful, repeating the transmission of the unscheduled message on the given channel; and d) if a plurality of unsuccessful transmissions exceeds a predetermined limit, selecting a different channel having a lower data rate.

8. A method as set forth in claim 7 wherein step a) includes:

determining the power available from the battery; and determining the power required to transmit the unscheduled message, based on the length of the unscheduled message and the associated data rate of the channel.

9. In a transceiver that receives power from a battery and that transmits unscheduled messages on one of a plurality of available channels, each available channel having an associated data rate, a method for the transceiver to select one of the available channels for transmission of an unscheduled message, comprising:

a) selecting a channel having a history of successful transmissions;

b) determining the power available from the battery;

c) determining the power required to transmit the unscheduled message on the channel selected in step a);

d) rejecting the selected channel and selecting a different channel having a higher data rate if the power required exceeds the power available;

e) if the power available exceeds the power required, transmitting the unscheduled message on the selected channel and, if an initial transmission is unsuccessful, repeating the transmission of the unscheduled message on the selected channel; and f) if the number of unsuccessful transmissions exceeds a predetermined limit, selecting a different channel having a lower data rate.

10. In a transceiver that receives power from a battery and that transmits unscheduled messages on one of a plurality of available channels, each channel having an associated data rate, a method for the transceiver to select one of the available channels for transmission of an unscheduled message, comprising:

determining the power available from the battery;

determining the power required to transmit the unscheduled message on a given channel; and rejecting the given channel and selecting a different channel for transmission if the power required exceeds the power available, the different channel being selected based on its having a higher data rate than the given channel.

* * * * *